Jan. 12, 1932.　　　　P. P. KUCERA　　　　1,840,513
GLASSWORKING MACHINE
Filed Nov. 19, 1924　　8 Sheets-Sheet 1

FIG. 1.

Jan. 12, 1932.    P. P. KUCERA    1,840,513
GLASSWORKING MACHINE
Filed Nov. 19, 1924    8 Sheets-Sheet 2

FIG. 2.

WITNESS
J. Herbert Bradley.

INVENTOR
Peter P. Kucera
By Green and McCallister
His Attorneys

Jan. 12, 1932.　　　　P. P. KUCERA　　　　1,840,513
GLASSWORKING MACHINE
Filed Nov. 19, 1924　　　　8 Sheets-Sheet 8

WITNESS
J. Herbert Bradley

INVENTOR
Peter P. Kucera
By Green and McCallister
His Attorneys

Patented Jan. 12, 1932

1,840,513

UNITED STATES PATENT OFFICE

PETER P. KUCERA, OF PITTSBURGH, PENNSYLVANIA, ASSIGNOR TO UNITED STATES GLASS COMPANY, A CORPORATION OF PENNSYLVANIA

GLASSWORKING MACHINE

Application filed November 19, 1924. Serial No. 750,787.

This invention relates to glass working and more particularly to an automatic glass working machine for making finished articles from rough blanks.

In the manufacture of various glass articles such, for example, as tumblers, a blank, such as a blown blank, having the general outline of the finished article but closed at the top is first formed. The closed end of the blank is then removed by cutting or burning, and the cut edge then finished.

An object of this invention is to provide a machine for automatically removing the end of such blanks and for then finishing or shaping the cut blank to the desired form.

When the closed end of such a blank is burned off an undesirable bead is formed around the edge thus made and a further object is to provide a machine for burning off the end of a blank and for then removing the bead formed by the cutting or burning operation and for shaping the blank to any desired form.

A still further object is to provide a machine for the purpose set forth which is automatic and rapid in action, easy to operate and simple and rugged in construction.

These and other objects which will be obvious to those skilled in this particular art are accomplished by means of this invention, one embodiment of which is illustrated in the accompanying drawings, wherein.

The particular embodiment of this invention, chosen for the purposes of illustration, includes a blank carrier which, in the present instance, is shown in the form of a rotatable spider having horizontally extending blank carrying arms. A blank holder is rotatably mounted in the outer end of each arm and mechanism is provided for securing a blank in each holder in an inverted position and by means of a vacuum. The blank carrier or spider is rotated intermittently so as to feed a succession of blanks up to and past the operating stations of the machine.

In order to simplify the description we will consider the present machine as constructed for the manufacture of tumblers from the blown blanks.

As a blank is inserted in one of the holders of the blank carrier it is carried to the burning or cutting station and brought into operative relation with a flame for burning off the end of the blank. In the present instance the torch or burner producing the flame is annular in form and means are provided for causing a relative rotation between the blank and the flame during the burning operation. After the end of the blank has been removed the blank is transferred by the blank carrier to the finishing station where the bead, formed on the burnt edge of the blank, is removed.

In the present instance the finishing mechanism includes jaws which are adapted to engage the tumbler blank on opposite sides of the beaded edge and to remove the bead by relative movement between the jaws and the blank. If desired, an additional heating means may be provided at the finishing station so as to maintain the edge of the blank at the proper temperature and render the bead easily removable. The jaws may be so manipulated as to give any desired form to the edge of finished articles.

From this station the blank is carried to the discharge point where it is automatically released from the holder by breaking the vacuum.

*Blank carrying mechanism*

I preferably mount my invention upon a base or platform 20 supported on suitable wheels 21 in order that it may be easily portable. A vertically extending sleeve 22 is formed in the center of the platform for supporting a vertical stationary shaft 23. A rotatable hollow tube 24 surrounds the shaft 23 and rests upon the top face 25 of the sleeve 22. An annular collar 26 is secured to and surrounds the upper portion of the hollow tube 24 and rests upon shoulders 27 formed thereon. A plurality of horizontally extending blank carrying arms 28 are secured to the collar and extend outwardly therefrom. An annular ring 29 is formed in the outer end of each arm and a blank holder 30 is rotatably mounted in each ring. The blank holder has a cup 31 secured thereto in which the blank to be held is inserted. Any form of blank may be carried merely by varying the form of cup, which is secured in the blank holder by means of a screw 32.

Figure 11:
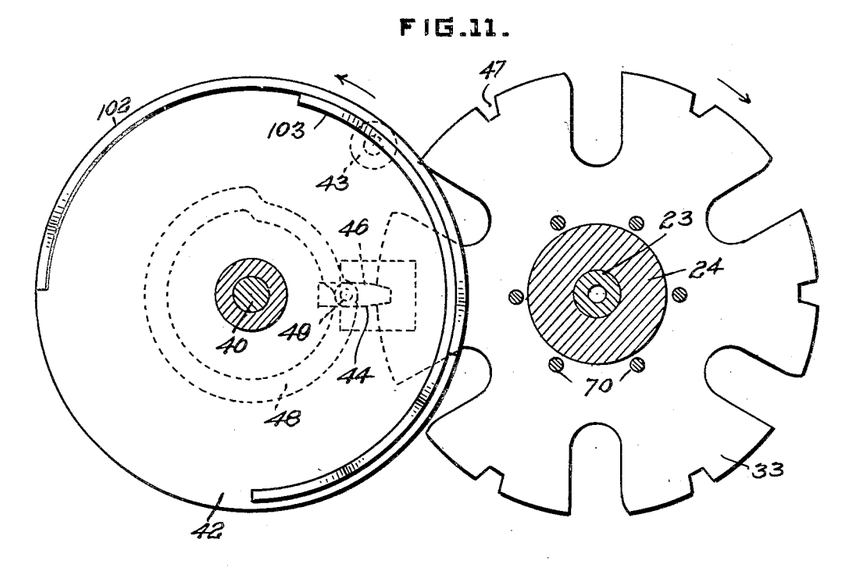
Fig. 11 is a horizontal section on the line 11—11 of Fig. 4, showing the driving mechanism for the blank holding spider.
Figure 12:
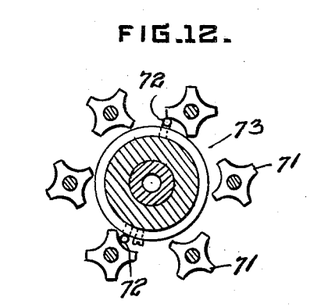
Fig. 12 is a horizontal section on the line 12—12 of Fig. 4, showing the means for automatically controlling the vacuum for securing the blanks to the blank holders

The blank carrying spider formed by the hollow tube 24, the horizontal arms 28 and the associated elements is intermittently rotated so as to carry a succession of blanks from the loading station A to the burning or cutting station B, thence to the finishing station C and thence to the discharge station D. The spider is rotated by a modified form of a Geneva movement in which the driven gear 33 is formed on the bottom of the hollow tube 24, see Figs. 4 and 11.

Power for operating the machine may, if desired, be derived from an electric motor 34 connected through gears 35 and 36 to a shaft 37 having a worm 38 for driving a worm wheel 39 mounted upon a shaft 40 which is rotatably supported in a bearing sleeve 41 formed in the supporting platform 20. A cam disc 42 is secured to the shaft 40 for rotation therewith. The bottom face of the cam disc is provided with a single driving tooth 43 for driving the gear 33 of the hollow tube 24. A slide-way 44 is formed on the top of the worm and gear housing 45 in which a lock 46 is slidably mounted for the purpose of engaging lock notches 47 formed in the periphery of the gear 33 for locking the spider in position, except during periods when it is actually moved by the tooth 43. A cam slot 48 is formed in the lower face of the cam disc 42 and a roller 49 mounted on the sliding lock 46 engages in the groove 48 so as to operate the lock in timed relation to the rotation of the gear 33. The lock 46 and the tooth 43 are so related that the gear 33 is unlocked only during periods of actual movement as a result of the engagement of the tooth 43 with the gear. There is no point at which the gear 33 and the blank carrying spider is unlocked but not moving.

Figure 5:
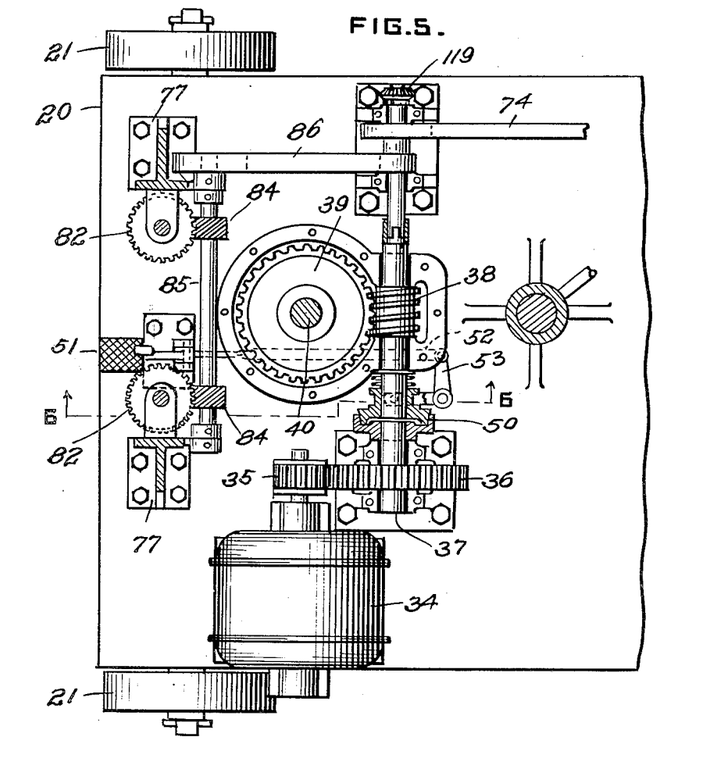
Fig. 5 is a horizontal section on the line 5—5 of Fig. 4.
Figure 6:
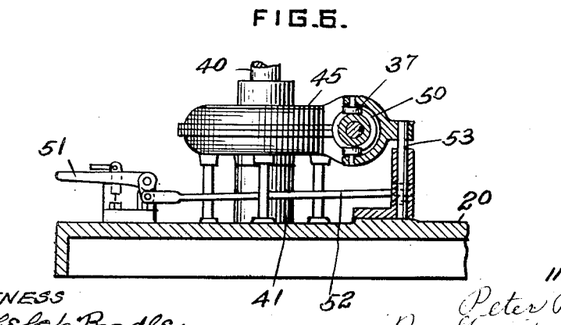
Fig. 6 is a vertical section on the line 6—6 of Fig. 5, certain of the elements being omitted.

A clutch 50 is provided on the shaft 37 for throwing the machine into and out of operation. The clutch may be manipulated by means of a foot lever 51 through the medium of a link 52 and a vertical shaft 53, see Figs. 5 and 6.

In order to hold a blank in each cup 31 the bottom of the cup has a series of perforations 54 communicating with an annular channel 55 formed in the opposite side of the bottom of the cup. The channel 55 communicates with an opening 56 in the blank holder which in turn leads to an annular groove 57 which communicates with a line 58 through a perforation 59 formed in the end of each arm 28. Each line 58 leads to a suitable valve 59 which in turn communicates through a perforation 60 formed in the hollow tube 24 with an annular inner channel 61. The channel 61 is connected by perforations 62 with the hollow interior 63 of a part of the central shaft 23. The hollow portion 63 extends downwardly to a second annular channel 64 with which it communicates by means of openings 65. The annular channel 64 is connected through perforations 66 in the sleeve 22 with a pipe line 67 leading to a vacuum chamber 68 which in turn is connected to a suction pump 69.

Each valve 59 has an operating shaft 70 extending downwardly through the gear 33. A star wheel 71 is mounted on the lower end of each shaft 70 and is adapted to be operated by means of lugs or pins 72 mounted on a collar 73, secured to the stationary sleeve 22. By means of this construction the vacuum in each blank holder 30 and vacuum cup 31 is automatically and individually controlled so that at the loading station A one of the pins 72 has operated the corresponding star wheel and turned the associated valve 59 so as to connect the associated blank holder with the vacuum tank and suction pump in order that a blank will be firmly held upon insertion at the station A. When the discharge station D is reached by each individual blank holder the corresponding star wheel is actuated by the other pin 72 to close the associated valve 59 and cut off the vacuum, thus releasing the finished article at that station. The pump 69 may, of course, be driven from any desired source, but, as illustrated, it is driven from the shaft 37 by a belt 74.

*Blank cutting or burning mechanism*

Figure 4:
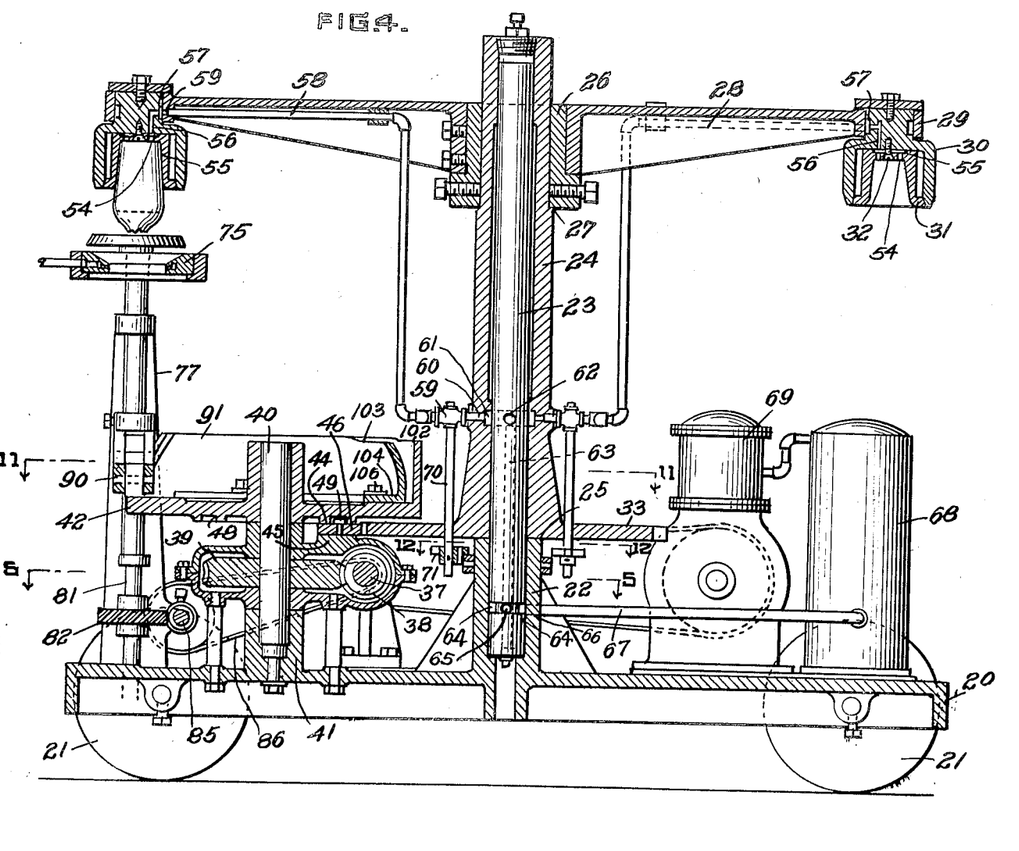
Fig. 4 is a vertical longitudinal section on the line 4—4 of Fig. 2.

The original blown blank which is inserted in the blank carrying mechanism at the loading station A may be of the form shown in Fig. 4 and it is necessary to cut or burn off the end of the blank. The blank is, therefore, carried to the cutting or burning station B for this purpose.

Figure 1:
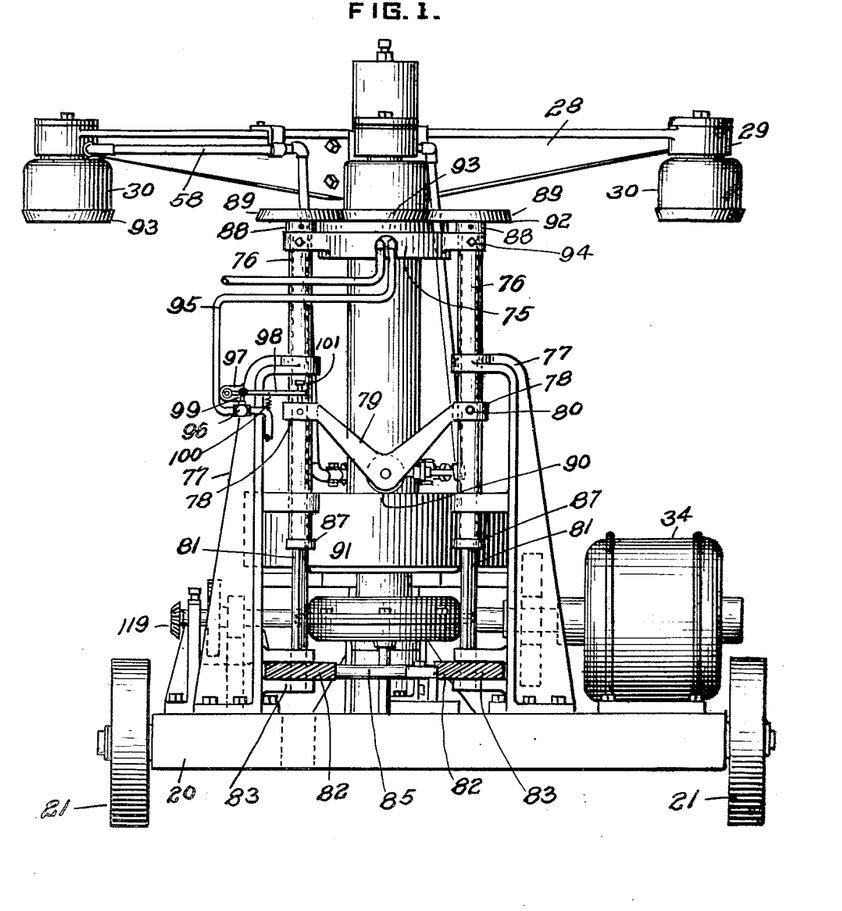
Figure 1 is a front view of a preferred form of apparatus embodying this invention.

At this point a burning mechanism is provided for removing the end of the blank. As illustrated, this mechanism includes an annular oxy-gas torch 75. The torch 75 is mounted upon vertical sleeves 76 (see Fig. 1) slidable in spaced brackets 77 which are mounted upon the platform 20. Each sleeve is adjustably secured to a collar 78 formed on one arm of a V-shaped cam lift 79 by means of set screws 80. A shaft 81 is rotatable within each sleeve 76 and each shaft is feathered to a worm wheel 82 mounted in a suitable bracket 83 formed on each bracket 77. Each worm wheel is driven by a worm 84 mounted on the shaft 85, driven by a belt 86 from the shaft 37, see Fig. 5.

Relative vertical movement of the sleeve 76 and the shafts 81 is prevented by means of lower collars 87 secured to the shaft at the lower end of each sleeve and upper collars 88 secured to each shaft at the upper end of each sleeve. Each shaft has a friction disc 89 having a beveled edge secured at the top thereof.

The burner and friction discs are lifted vertically into operative relation with a blank at the proper time by means of the cam lift 79 provided with a roller 90 which is raised and lowered by means of the rotating cam 91 mounted on the upper face of the cam disc 42. As hereinafter described the length of time during which the burner is in operative relation to a blank may be controlled. Each friction disc 89 has a beveled face 92 which is adapted to engage the oppositely beveled face 93 formed on each blank holder 30. Each blank holder being rotatable in the supporting arm 28 the engagement of each blank holder with the rotating friction discs 89 rotates the former and with it the blank which at this station is surrounded by the annular torch 75 which has been raised into operative position simultaneously with the rotating friction discs. Various sizes and forms of blanks may be accommodated upon the machine by securing the sleeves to the cam lift at different points through the medium of the set screws 80 and the burner itself may be adjusted upon the sleeve 76 through the medium of the set screws 94 so as to change the distance between the friction discs and the burner in accordance with varying lengths of the articles. At the same time the vacuum cups 31 may be changed so as to accommodate various forms of blanks.

The supply of oxygen to the torch through the connection 95 is automatically controlled by means of a valve 96 which is turned on and off by the vertical reciprocations of the cam lift 79. An outwardly extending bracket 97 is formed on one of the brackets 77 and a valve operating lever 98 is pivoted thereon. The lever is connected to the valve by a link 99 and a spring 100 tends to move the free end of the lever downwardly so as to close the valve 96 and shut off the supply of oxygen. The lever extends inwardly over one collar 78 of the cam lift 79 and a set screw 101 is threaded through the end of the lever and adapted to engage the adjacent collar 78. Upon the torch and associated mechanism being lifted by the cam 91 and cam lift 79 into operative relation with the blank the collar 78 strikes the set screw 101 so as to raise the lever 98 and open the valve 96. When the closed end of a blank has been burned off the mechanism is lowered and the spring 100 draws the lever downwardly so as to shut off the supply of oxygen.

Figure 2:
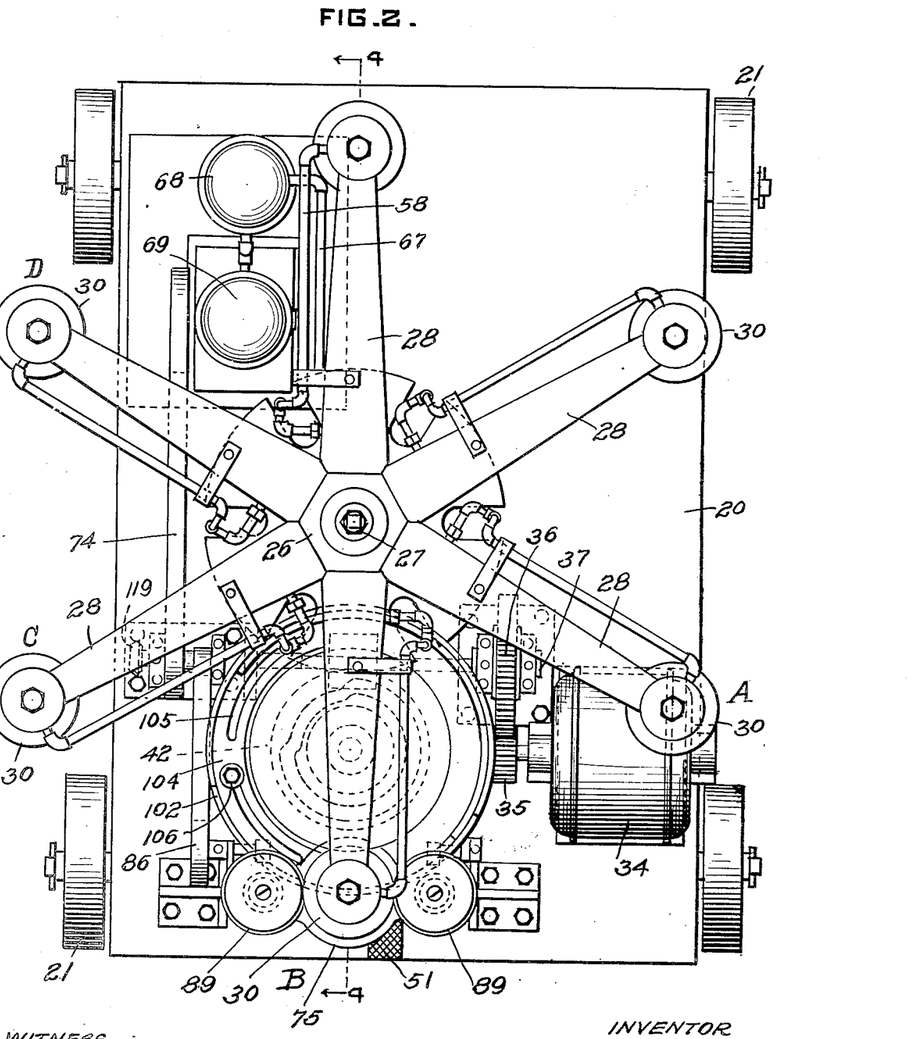
Fig. 2 is a top plan view thereof with the glass finishing station removed.
Figure 13:
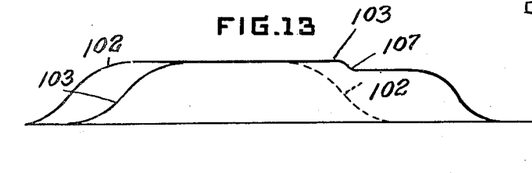
Fig. 13 is a diagrammatic view of the adjustable burner operating cam.

The length of time required to burn off the end of the blank will vary with different types of blanks and there is accordingly provided a simple adjustment for controlling the length of time that the torch is held in raised operative position. The cam 91 is formed by two cam faces 102 and 103, see Figs. 11 and 13. The first cam face 102 is rigidly secured to the cam disc 42, while the inner cam face 103 is arcuately adjustable thereon and for this purpose it is formed with a flange 104 (see Fig. 2) provided with slots 105 by means of which it may be adjustably secured to the cam disc through the medium of screws 106 extending through the slots. The cam face 102, being rigidly secured to the cam disc, always raises the torch at the same time, namely, immediately after the blank has reached the burning off position B. The length of time during which the torch is maintained in its raised operative position is determined by the position of the cam face 103 as it will be obvious from Figs. 11 and 13 that the cam face 102 drops shortly after the cam face 103 comes into contact with the roller 90. The cam face 103 is provided with a short drop 107 which is provided for the purpose of conserving the supply of oxygen. The intense heat of the full flame is not necessary during the latter part of the burning off operation, so that drop 107 permits the valve lever 98 to partially close the valve 96 in order to reduce the supply of oxygen to the torch during the latter part of the burning off operation. At the end of the operation the roller rides down the slope of the cam 103, the oxygen is entirely shut off and the burner and friction discs are returned to inoperative position.

*Article finishing mechanism*

At this point the modified Geneva movement rotates the blank carrying spider one step so as to bring a new blank to the burning position B and carry a cut or burned blank to the finishing station C.

At the latter station the bead which is formed on the burned edge of the blank is removed and the final shape given to the finished article.

Figure 3:
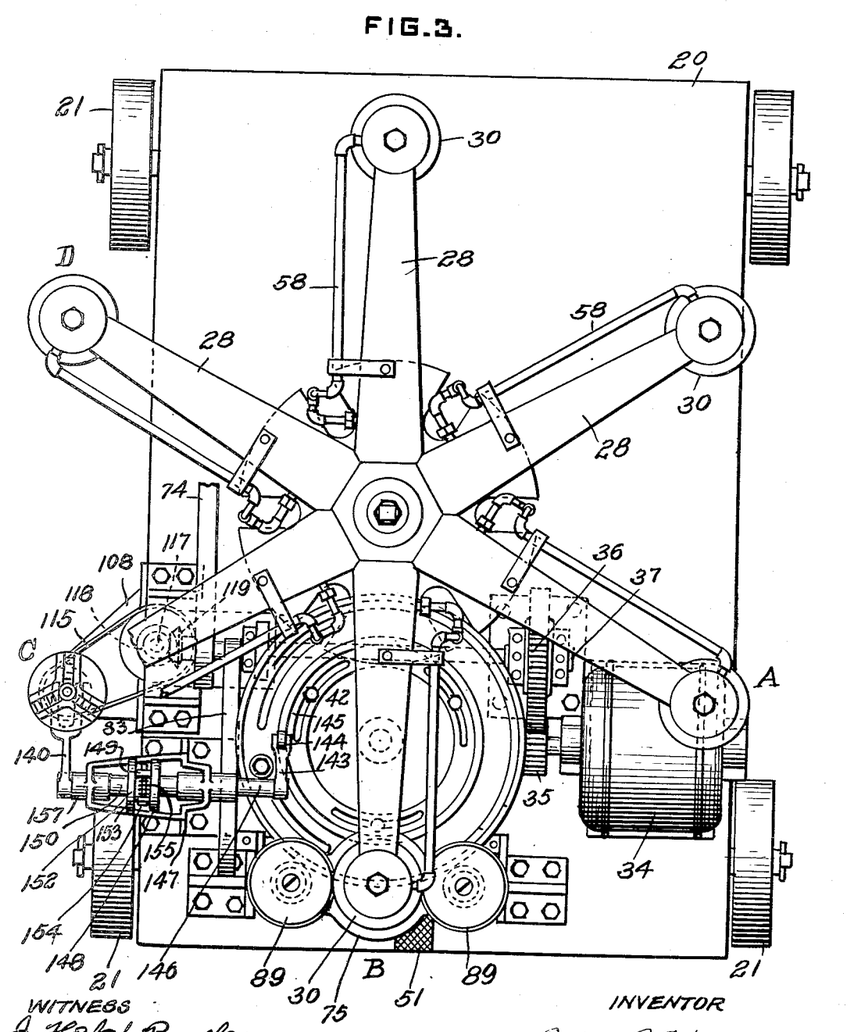
Fig. 3 is a similar view showing the glass finishing apparatus in place.

The finishing mechanism is mounted in a bracket 108 supported on the platform 20. A tube 109 is secured to a sleeve 110, see Fig. 8, by means of screws 111 and is mounted for rotation and reciprocation in the bracket 108. Within the tube 109 is a guide shaft 112 for controlling the vertical movement of the finishing means. The tube is rotated by means of a pulley 113 which is feathered thereto and mounted in an arm 114 of the bracket 108. The pulley is driven by belt 115 (see Figs. 3 and 7) from a second pulley 116 secured to a shaft 117 having a beveled gear 118 mounted thereon and meshing with a second gear 119 secured to the drive shaft 37.

The upper end of the sleeve 110 has an annular recess 120 (see Fig. 8) which surrounds the tube 109 and forms a seat for one end of a helical spring 121 on which rests the finishing jaw supporting block 122. The jaw supporting block is secured to the rotating hollow tube 109 by a tight fit and a collar 123, formed at the top of the guide rod 112, engages a shoulder 125 on the hub of the jaw support 122 so as to hold the members in assembled relation.

Figure 7:
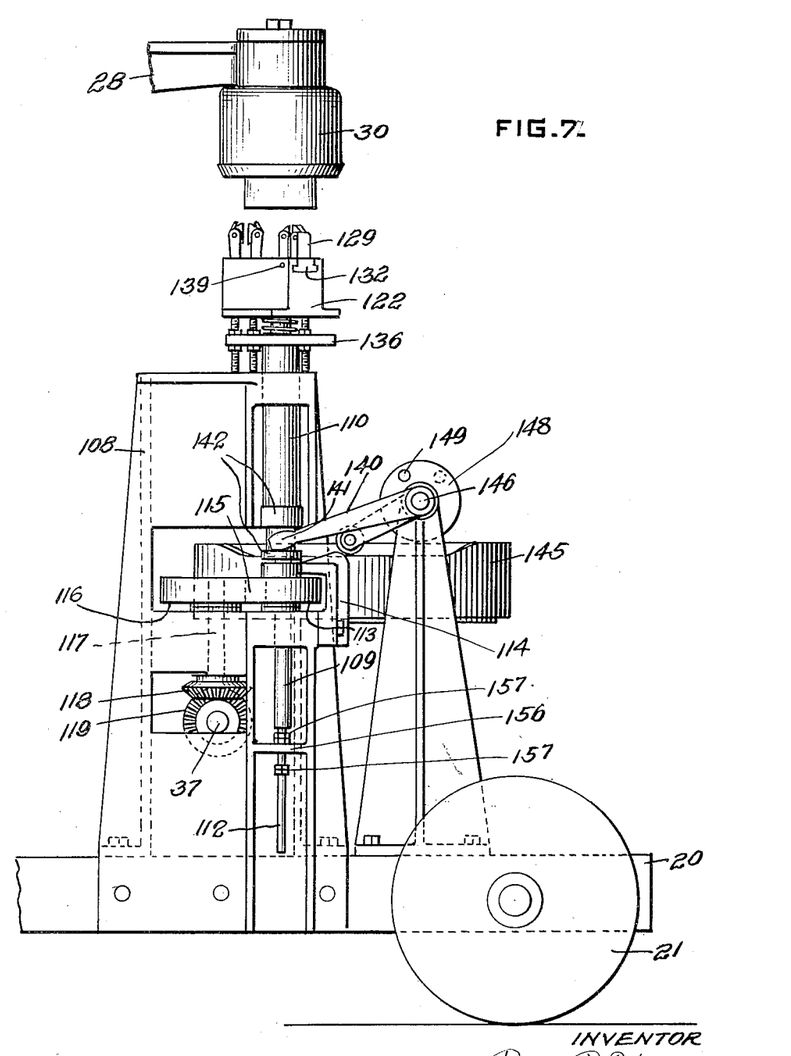
Fig. 7 is a view in elevation of the blank finishing and bead removing apparatus.
Figures 8, 8A, 9, 10:
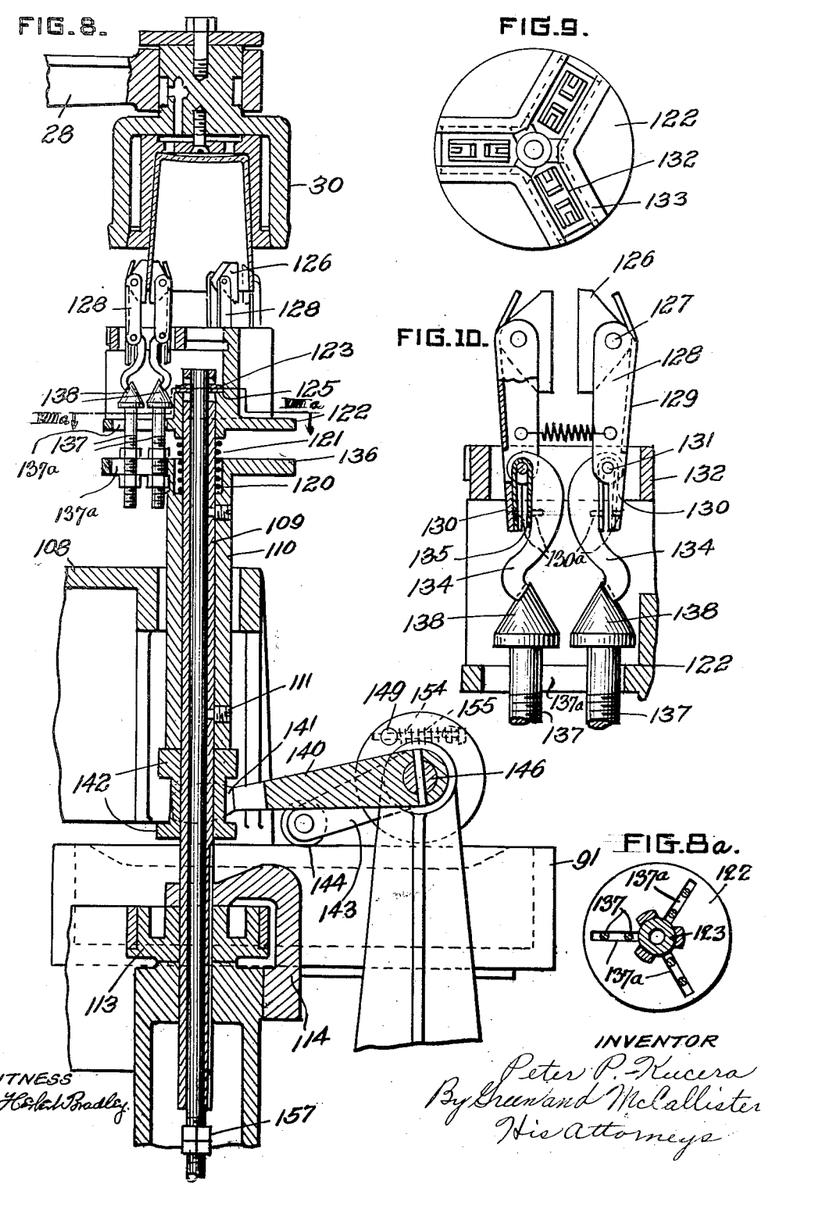
Fig. 8 is a vertical longitudinal section thereof.
Fig. 8a is a reduced section taken along the line VIIIa—VIIIa of Fig. 8.
Fig. 9 is a top plan view of the blank finishing jaws and the support therefor.
Fig. 10 is a sectional view of the blank finishing jaws and the operating mechanism therefor on an enlarged scale.

The finishing jaws may be of any desired form and as illustrated in Fig. 10 comprise three sets of jaws, each set including cooperating jaws 126 mounted upon a pivot 127 extending between the flanges 128 of the jaw levers 129, which are of substantially channel shape, as illustrated. The back 130 of each channel extends above and below the ends of the side flanges 128. Each channel is mounted on a pivot 131 in a jaw carriage 132 which is radially adjustable in slots 133 formed in the top of the supporting block, see Figs. 7 and 9.

Jaw operating levers 134 are mounted on each pivot 131 and a leaf spring 135 extends over the pivot between the operating lever 134 and extension 130 of the jaw supporting channel 129. Obviously upon separating the lower ends of the operating levers 134 and jaws will be forced toward each other by a resilient pressure, due to the pressure of the lever upon the springs 135 and in turn the springs pressing upon the extended portion 130 of the channels 129. The resilient leaf spring 135 is secured by rivets 130a at one end to the extension 130 of the jaw supporting channels 129, and at the other end to the outer face of the jaw operating lever 134, thus forming a compression unit which normally holds the jaws in open position. As shown in Figure 10, the coil spring in ordinary use is of a light tension type and is connected (preferably detachably) between the jaw supporting channels 129, in order to somewhat balance and offset the action of the heavy leaf spring 135. In other words, it is much easier to design a leaf spring such as 135 of an approximate required value and then to balance the excess resilience by the action of a relatively more sensitive and easily calibrated coil spring. Not only does the coil spring accomplish the above-mentioned purpose, but it also makes the work of the rods 137 and their cone-shaped ends 138 much lighter and, further, tends to give the channels 128 a quick, "snappy" action. A number of coil springs of different calibrated tensions may be provided and used to give the necessary jaw action, or if the compression spring 135 happens to exactly meet the requirements, the coil spring may be entirely omitted, and if the compression spring 135 is of lesser resiliency than required, a coiled compression spring may be substituted for the tension spring shown in Fig. 10.

A flange 136 (see Figs. 7, 8) is formed at the top of the sleeve 110 and vertically extending rods 137 are adjustably mounted in the flange and extend upwardly into the jaw supporting box 122 where their cone-shaped ends 138 are adapted to engage the lower ends of the levers 134 so as to open and close the finishing jaws 126 upon movement thereof.

Although in Figure 10 the operating rods 137 have very slightly compressed the springs 135, yet their natural form is substantially that shown in this figure. One end of each spring 135 is secured to the extending jaw 130 of its associated jaw lever 129 and the other end is secured in position against the outer face of the associated jaw operating lever 134. Since the normal shape of the spring is substantially shown in Figure 10, as before explained, then due to the fact that its ends are secured to an associated jaw operating lever 130 and jaw lever 129, it will be seen that the finishing jaws 126 are normally held out of operating relation with a blank by reason of the springs' resiliency to tension; and, when the vertically operated rods 137 forces the jaw operating lever 134 outwardly, the spring 135 will resist the compressive force thereby exerted, this results in the jaws 126 being resiliently held against the sides of the blank directly through the agency of the force exerted by the rods 137 and indirectly by the compression resisting force of the springs 135. Thus it is seen, the U-shaped springs 135 have a double purpose; normally, they serve to hold the jaws 129 out of cooperation with the sides of a blank but upon being compressed, resiliently hold the same jaws in cooperation with the sides of a given blank.

The jaw carriages 132 are radially adjustable in the support 122, see Figs. 7 and 9, so that the machine can operate upon various sized articles, and set screws 139 engage the carriages 132 for securing the jaws in adjusted position. Also, as seen from Figs. 8 and 8a, the extending rods 137 are disposed within the radial slots 137a formed in the jaw support 122, and are adjustably mounted within radial slots 137a similarly formed within the flange 136, in order that these rods 137 may be adjusted to co-operate with the levers 134 when the position of the jaw carriages 132 is changed.

Vertical movement of the finishing mechanism is obtained by means of a lever 140 whose forked end 141 embraces the sleeve 110 between the collars 142 formed thereon. Movement of the lever 140 is occasioned in timed relation to the operation of the blank carrier by means of a cam operated lever 143 having a roller 144 adapted to be operated by an adjustable cam 145 mounted on the cam disc within the burner operating cam 91. The lever 143 is secured to a shaft 146 which is rotatably mounted in a bracket 147, see Fig. 3. The outer end of the shaft 146 is provided with a disc 148 having a perforated pin 149 secured thereto. A second shaft 150 is mounted in a bracket 151 in alignment with the shaft 146 and the inner end of the shaft 150 is provided with a disc 152 which is provided with an inwardly extending perforated pin 153. A bolt 154 or similar device is loosely mounted in the perforations of the pins 149 and 153 and a helical spring 155 surrounds the bolt and tends to force the pins 149 and 153 apart.

By means of this construction a yielding connection is provided between the cam lever 143 and the finishing mechanism lifting arm 140 so that when the cam 145 raises the lever 143 the disc 148 is rotated so as to compress the spring 155 and rotate the disc 152 in the same direction by a yielding pressure. Rotation of the disc 152 receives the arm 140 and lifts the finishing mechanism into operative relation with the blank at station C.

The guide shaft 112 extends downwardly below the tube 109 through a perforation in a shelf 156 (see Fig. 7) and stop nuts 157 are secured to the guide shaft both above and below the shelf for controlling the extent of its vertical movement.

Upward movement of the arm 140 raises the support-tube 109, the sleeve 110 and the shaft 112 until the lower stop nuts engage the shelf 156. This prevents further upward movement of the shaft 112, and later, of the tube 109, after the latter has engaged the collar 123 (see Fig. 8) formed at the upper end of the shaft. At this point the jaw supporting block 122 has been raised to such a position that the burned or unfinished edge of the blank in the blank holder lies between the co-operating jaws 126 of each pair. There is no relative movement between the rod 109 and the sleeve 110, since both are rigidly secured together by suitable screws 111 and are raised and lowered by means of the arm 140; the spring 121 has a slotted fit between the tube 109 and the sleeve 110 and extends therefrom to cooperate with a downwardly extending ridge or face of the jaw supporting lock 122 in order to normally hold the combined tube and sleeve element in lowered position and to resiliently resist the raising thereof by the arm 140.

As seen from Figure 8, the supporting tube 109 is cut short at its upper end which is positioned within the block 122, in order that after the shaft 112 has engaged the shelf 156, the arm 140 may continue to raise the tube 109 and sleeve 110 (the former sliding over the shaft 112), limited only by the engagement of the end of the tube 109 with the collar 123 (see Fig. 8) formed at the upper end of the shaft.

Figure 8 shows the jaws 128, positioned around the edge of a blank, but not yet positioned with a yielding pressure thereagainst; for, as seen, the tube 109 has a short distance to travel before engagement with the collar 123, and the spring 135 has been compressed, if at all, very little.

The spring 121 permits the sleeve 110 to continue its upward movement so as to raise the jaw closing cones 138 and force the jaws 126 into engagement with the blank with a yielding pressure. The jaw block is rotated by the pulley 113 with the result that the bead which was formed during burning is removed and the finished contour is impressed upon the blank. Obviously any desired configuration can be imparted to the blank by providing suitably shaped finishing jaws.

It will also be obvious that any desired form of blank heating means may be provided at the finishing station so as to maintain the blank at the proper working temperature.

In operation a blank is placed in the vacuum cup 31 at the loading station A. At this point the corresponding star wheel 71 has been rotated by one of the pins 72 so as to open the connecting pipe line and create a vacuum in the cup which will securely hold the blank in place.

The blank carrier is then rotated so as to move the blank to the burning station B over the annular torch. The carrier is locked in this position by the slide lock 49 and the torch raised to operative relation with the blank. The friction discs 89 simultaneously engage the blank holder 30 so as to rotate it with the result that the blank is rotated within the annular torch. The oxygen valve 96 having been opened by the upward movement of the cam lift 79 through the medium of the lever 98 and set screw 101 a hot flame strikes the blank at the point where it is desired to have the closed end thereof cut off. At the proper time the drop 107 in the adjustable cam face 103 lowers the cam lift 79 sufficiently to reduce the amount of oxygen being fed into the torch in order that the supply thereof may be conserved. When the closed end of the blank has been completely removed the cam lift rides down the slope of the adjustable cam face 103, the supply of oxygen is cut off and the torch and friction discs are lowered away from the blank carrier. The latter is again rotated so as to bring a fresh blank into position where the burning off operation is repeated. In the meantime the cut or burned blank is carried to the finishing station C. As soon as the blank reaches this station the cam 145 raises the arm 140 through the yielding connection or spring 155 between the discs 148 and 152. The finishing mechanism is raised into operative relation with the blank as above described and the jaws are pressed into engagement with the end thereof by a yielding pressure so as to remove the bead formed around the edge of the blank during the burning process and so as to impress the desired configuration upon the finished article.

If desired, instead of rotating the jaws they may be merely pressed into engagement with the hot glass so as to make an intermittent or repeated design around the edge thereof.

The finishing mechanism is then lowered by means of the roller 144 in the cam arm 143 riding down the end slope of the cam 145 and the blank carrier is again rotated to move a new blank into burning position and to carry a burned blank into finishing position. The finished blank is carried to the discharge station D where another pin 72 engages the corresponding star wheel so as to shut off the vacuum from the connected blank carrier and automatically discharge a finished article from the machine.

The operation of the machine is continuous and rapid and it requires no attention other than that of supplying the blanks to the carrier.

Although I have described and illustrated a specific embodiment of this invention I do not wish to be limited to the various details thereof but what I claim as new and desire to secure by Letters Patent is:

1. The combination in a glass working machine, of a blank holder, a torch, a cam for raising and lowering said torch into and out of operative relation with the blank held in said holder and means operated by upward movement of said torch for supplying fuel thereto and operated by downward movement of said torch for reducing the supply of fuel thereto.

2. The combination in a glass working machine, of a blank carrier, a vertically movable burner, means for raising and lowering said burner into and out of operative relation with a blank in said holder, means for causing relative rotation between said burner and said blank while in operative position so as to burn off a portion of said blank and means for moving said carrier so as to present a new blank when said burner has been lowered out of operative position.

3. The combination in a glass working machine, of a blank carrier, a vertically movable burner, means for raising and lowering said burner into and out of operative relation with a blank in said holder, means for causing relative rotation between said burner and said blank while in operative position so as to burn off a portion of said blank, means for moving said carrier so as to present a new blank when said burner has been lowered out of operative position and means for finishing the previously burned blank.

4. The combination in a glass working machine, of a blank carrier, a vertically movable annular burner, a cam for raising and lowering said burner into and out of operative relation with a blank in said holder, means for rotating said blank when said burner is in raised position so as to burn off a portion of said blank, means for rotating said blank carrier so as to move an additional blank into position and means for finishing said previously burned blank.

5. The combination in a glass working machine, of a rotatable blank holder, an annular torch adapted to burn off a portion of a blank held in said holder, a cam for raising and lowering said torch into and out of operative relation with said blank, friction discs movable with said torch into engagement with said blank holder so as to rotate said holder and said blank when said torch is in raised position and means for releasing the blank from said holder.

6. The combination in a glass working machine, of a rotatable blank holder, an annular torch, a cam for raising and lowering said torch into and out of operative relation with the blank held in said holder, friction discs movable with said torch into engagement with said blank holder for rotating said blank within said torch and means for adjusting the effective length of said cam for varying the time of burning of said blank.

7. The combination in a glass working machine, of a blank carrier, rotatable burnishing jaws adapted to shape the blank held in said carrier, means for raising said jaws into yielding contact with said blank, means for rotating said jaws, an arm for raising and lowering said jaws into and out of operative relation to said blank, a cam for operating said arm and a yielding connection between said cam and said arm.

8. The combination in a glass working machine, of a blank carrier, burnishing jaws adapted to shape a blank held in said carrier, means for moving said jaws relatively to said blank, an arm for raising and lowering said jaws into and out of operative relation to said blank, a cam for operating said arm and a yielding connection between said cam and said arm.

9. The combination in a glass working machine, of a spider provided with blank carrying arms, a rotatable vacuum cup in each arm for holding a series of blanks, an annular burner adapted to be moved into operative relation with the blank in one of said arms, friction discs for rotating said vacuum cup and said blank when said burner is in operative relation thereto, means operated by movement of the burner for controlling the supply of fuel thereto, finishing jaws for finishing a blank previously heated by said burner, means for intermittently rotating said spider so as to present successive blanks to said burner and said finishing jaws, and means for cutting off said vacuum from said cups after said cups are moved passed said finishing jaws.

10. The combination in a glass working machine of a holder, a burner for applying a flame to an article in said holder, means for moving said burner so as to subject said article to the flame thereof, means for separating said burner and said holder and means operated by movement of the burner for varying the flame thereof.

11. The combination in a glass working machine having a plurality of operating stations, of a blank carrying spindle for feeding a succession of blanks to said stations, a rotatable vacuum cup for holding a blank from each arm of said spindle, said cup having an annular beveled face, frictional disc means for intermittently engaging the beveled face of each of said cups for producing rotation thereof.

12. The combination in a glass working machine, of a blank carrier, jaws for shaping a blank held in said carrier, said jaws being pivoted to channel shaped levers, each of said levers being mounted on a jaw carriage, a supporting block, each jaw carriage being radially adjustable in slots formed in the top of said block, and means engaging said carriages for securing said jaws in an adjusted position.

13. The combination in a glass working machine, of a blank carrier, jaws for shaping a blank held in said carrier, levers pivoted to and extending below said jaws, means for normally holding said jaws out of operative relation with respect to the blank, and means for separating the lower ends of said levers, so that said jaws will press against the blank.

14. The combination in a glass working machine, of a blank carrier, jaws for shaping a blank held in said carrier, said jaws being pivotally connected with operating levers, adjustably-mounted vertically-extending rods having cone-shaped ends formed to engage downwardly extending ends of said operating levers so that said levers will be spread apart and said jaws will be positioned against a given blank.

15. The combination in a glass working machine, of a blank carrier, jaws for burnishing a blank held in said carrier, channel-shaped levers pivoted to and extending below said jaws, each channel lever being mounted on a jaw carriage and pivoted to a downwardly extending operating lever, resilient means positioned between each of said channel levers and its associated operating lever for normally holding the jaws open, and means engaging said operating levers for spreading them apart and pressing said burnishing jaws against an edge of the blank.

16. The combination in a glass working machine, of a blank carrier, jaws for shaping a blank held in said carrier, said jaws being pivotally connected with operating levers, adjustably mounted vertically-extending rods formed to engage and spread apart the extending ends of said levers for closing said shaping jaws against a given blank, and means for raising and lowering said rods in timed relation to the operation of said machine.

17. The combination in a glass working machine, of a blank carrier, jaws for shaping a blank held in said carrier, said jaws being pivotally connected with operating levers, adjustably mounted vertically-extending rods having cone-shaped ends formed to engage the downwardly extending ends of said operating levers so that said levers will be spread apart and said jaws will be positioned against a given blank, and means cooperating with an adjustable cam disc for raising and lowering said rods in timed relation to the operation of said machine.

18. The combination in a glass working machine, of a blank carrier, jaws for shaping a blank held in said carrier, said jaws being pivotally connected with operating levers, adjustably mounted vertically-extending rods having cone-shaped ends formed to engage downwardly extending ends of said operating levers so that said levers will be spread apart and said jaws will be positioned against a given blank, and means for rotating said jaws about a given blank for burnishing it.

19. The combination in a glass working machine, of a blank carrier, said carrier having a frictional face, a burner station provided with rotating means, means raising and lowering said burner into and out of burnishing relationship with a blank and raising and lowering said rotating means into and out of operative relation with respect to the face of said carrier, so that the blank will be simultaneously rotated and burnished, a valve sensitive to the raising and lowering of said burner so that the intensity of said flame may be varied to produce a preliminary, a burnishing, and a finishing heat upon the blank.

20. The combination in a glass working machine having a plurality of operating stations, of a blank carrying spindle for feeding a succession of blanks to said stations, a rotatable vacuum cup secured to each arm of the spindle for holding a blank therein, said cups having a frictional face, rotating means at one of the stations intermittently engaging the frictional face of each of said cups for producing rotation thereof, said operating station including a burner provided with means for raising it into burnishing relation with a blank carried by the cup being rotated and for lowering it when the burnishing operation has been completed.

21. The combination of a glass working machine having a plurality of operating stations, of a blank carrying spindle for feeding a succession of blanks to said stations, a rotatable vacuum cup mounted on each arm of said spindle for holding a blank therein, one of said stations including a burner having a rotating frictional means for rotating a vacuum cup, and means for simultaneously raising and lowering said burner into burnishing relation with a given blank and raising and lowering said frictional means into rotative engagement with the blank holder, means for increasing the intensity of the flame of said burner when being raised and for decreasing the intensity of the flame of said burner when being lowered.

22. The combination in a glass working machine having a plurality of operating stations, of a blank carrying spindle for feeding a succession of blanks to said stations, a rotatable vacuum cup secured to each arm of said spindle for holding a blank therein, said cups having a beveled frictional face, rotating means at one of the stations intermittently engaging the face of each of said cups for producing rotation thereof, said one of operating stations including a burner, means simultaneously raising and lowering said burner into and out of burnishing relationship with a given blank and said rotating means into and out of frictional engagement with the vacuum cup holding said blank, so that said blank will be rotated while being burnished by said burner, and means decreasing the intensity of the flame of said burner when said burner and said rotating means are lowered a short distance by said raising and lowering means, so that said rotating means will still be in frictional engagement with the cup and the blank will be finished off, said raising means, after a short period of time, lowering said burner and said rotating means completely out of operative and burnishing relationship, so that a new blank may be moved into position for burnishing.

23. The combination in a glass working machine having a rotating spindle provided with a plurality of arms, each of said arms having a vacuum cup secured to the end thereof for holding a blank therein, of a burner station for said blanks, said burner station being provided with two rotating circular discs, a V-shaped cam driven arm for raising and lowering said burner station into and out of burnishing relationship with a given blank and raising and lowering said circular discs into and out of engagement with the vacuum cup holding the given blank, so that the given blank will be simultaneously rotated and burnished, means for timing the period during which said burner and said rotating means are held in operative position, and means for varying the intensity of the flame of said burner simultaneously with the position of the burner.

In testimony whereof, I have hereunto subscribed my name this 18th day of November, 1924.

PETER P. KUCERA.